United States Patent

[11] 3,575,529

[72] Inventor David Bierman
Piqua, Ohio
[21] Appl. No. 739,306
[22] Filed June 24, 1968
[45] Patented Apr. 20, 1971
[73] Assignee Hartzell Propeller, Inc.,
Piqua, Ohio

[54] METHOD AND APPARATUS FOR OPERATING A PROPELLER AND DRIVING ENGINE FUEL VALVE
14 Claims, 10 Drawing Figs.

[52] U.S. Cl. .................................................. 416/27,
416/46, 416/48, 416/50
[51] Int. Cl. ..................................................... B13h 3/10,
B64c 11/40
[50] Field of Search .................................. 170/135.74;
416/27, 25, 47, 44, 45, 46, 48, 49, 50, (Inquired)

[56] References Cited
UNITED STATES PATENTS

| | | | |
|---|---|---|---|
| 3,004,608 | 10/1961 | Pond ............................ | 416/47 |
| 2,872,986 | 2/1959 | Cartwright .................... | 416/27 |
| 3,249,159 | 5/1966 | Biermann ...................... | 416/50 |
| 2,320,195 | 5/1943 | Rindfleisch ................... | 170/135.74 |
| RE22,661 | 8/1945 | Gosslau et al. ............... | 170/135.74 |
| 2,640,551 | 6/1953 | Plumb .......................... | 170/135.74 |
| 2,667,935 | 2/1954 | Woodward .................... | 170/135.74 |
| 2,678,698 | 5/1954 | Lee II .......................... | 170/135.74 |
| 2,759,549 | 8/1956 | Best .............................. | 170/135.74 |
| 2,781,856 | 2/1957 | Danvers et al. ............... | 170/135.74 |
| 2,829,722 | 4/1958 | Best .............................. | 170/135.74 |
| 2,978,035 | 4/1961 | Haworth ....................... | 170/135.74 |
| 3,088,523 | 5/1963 | Smalley et al. ............... | 170/135.74 |
| 3,261,405 | 7/1966 | Andrews, Jr. ................. | 170/135.74 |

FOREIGN PATENTS

| | | | |
|---|---|---|---|
| 127,212 | 2/1947 | Australia ....................... | 416/27 |
| 581,327 | 10/1946 | Great Britain ................. | 416/47 |

Primary Examiner—Al Lawrence Smith
Attorney—Melvin A. Crosby

ABSTRACT: A control system for a variable pitch propeller having a driving engine with a fuel throttle in which the pitch of the propeller is automatically controlled to maintain substantially constant engine speed while the throttle is manually adjusted during takeoff and cruising, and the throttle is automatically adjusted to maintain substantially constant engine speed while the pitch of the propeller is manually adjusted during landing and taxiing. A single control lever is provided for selectively making one or the other system of operation effective.

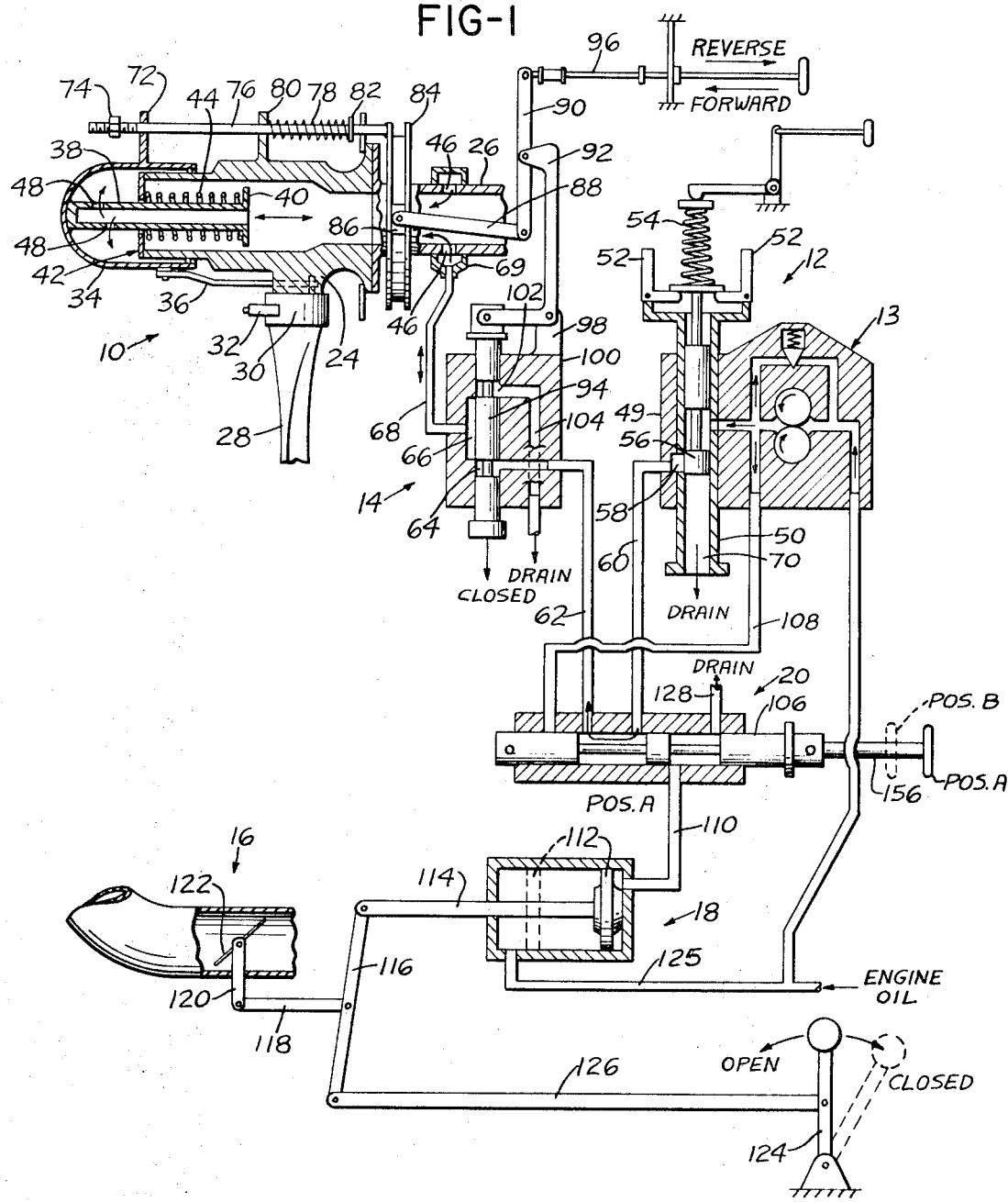
FIG-1
FIG-2
INVENTOR.
DAVID BIERMANN
BY
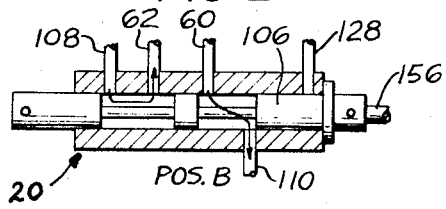

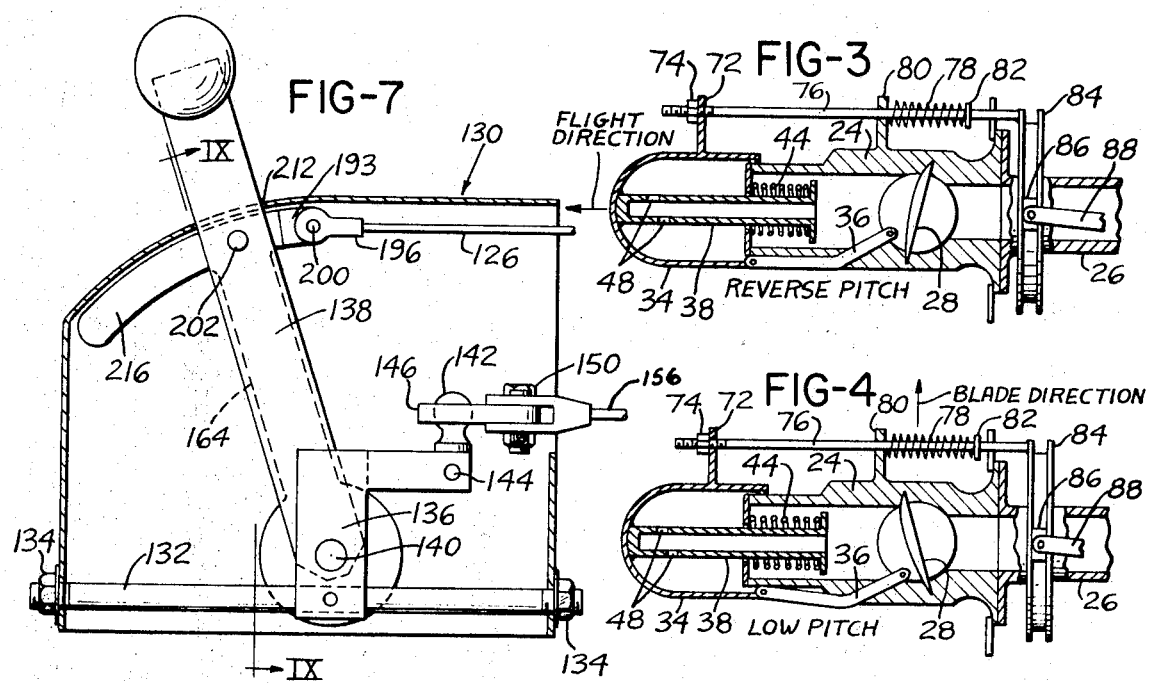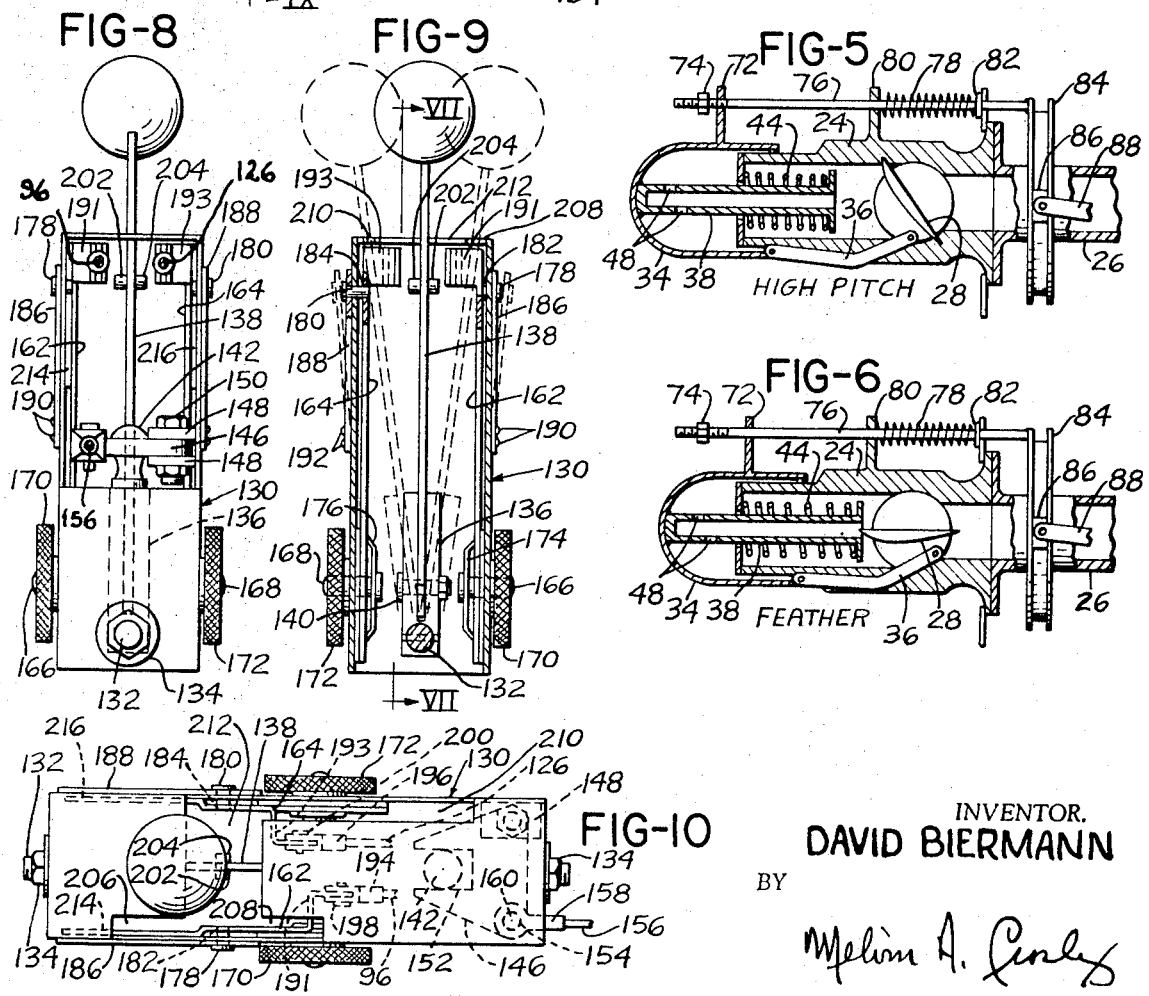

METHOD AND APPARATUS FOR OPERATING A PROPELLER AND DRIVING ENGINE FUEL VALVE

This invention relates to propellers and to control systems therefor, and is particularly concerned with variable pitch propellers and a control arrangement for such propellers in which the benefits of different types of propeller control systems can be realized.

Variable pitch propellers are, of course, well known and are widely used in connection with both single engine and multiple engine aircraft. The pitch of a variable propeller is adjusted to realize certain desirable conditions of operation and this control may be automatic or manual, according to the particular control elements employed.

A number of methods of controlling propeller pitch and speed of rotation may be outlined as follows:

a. The governor method, which causes the propeller pitch to change in a direction to result in constant engine r.p.m.
  b. The direct control of the propeller pitch by the pilot. The engine r.p.m. in this case, is controlled manually by means of throttle adjustment by the pilot.
  c. The same as (b) but including a governor to adjust the throttle to maintain constant engine r.p.m.

Each of these systems has its merits as will be described as follows:

The method under (a) is ideal for takeoff, climb, and cruise conditions because a definite fraction of the engine power can be held for each condition, independent of the speed of flight. Furthermore, it is important that all propellers of a multiengine aircraft rotate at exactly the same speed in order to avoid objectionable "beats" between two propeller vibrational frequencies.

The method under (b) is a compromise which eliminates the complexity of the governor but provides a means whereby the pilot can adjust the pitch for different flight conditions. The engine r.p.m. does not remain constant as the airspeed changes, making it necessary for the pilot to adjust the pitch of the propeller. This method is sometimes combined with (a) for reverse thrust control, during which time the governor is inactivated.

The method under (c) is ideal for reverse thrust operation but not for forward thrust during takeoff and climb.

The principal object of the present invention is to provide means whereby the utility of controllable pitch propellers can be greatly increased.

Another object is to provide means whereby the method of controlling the pitch of propellers can be changed during flight from one basic system to another, in order to take advantage of the features of each of the above referred to systems during the flight conditions for which they are best fitted.

Still another object is to provide, in combination, a mechanism whereby the pitch of the propeller is adjusted automatically during forward thrust operation by means of a governor; a mechanism whereby the pitch is adjusted manually during reverse thrust operation; and a mechanism for switching from one system to the other during flight.

Yet another object is to provide, in combination, a mechanism for adjusting the engine power by means of a manually controlled engine throttle while a governor controls the pitch of the propeller to effect a prescribed constant rotational speed; a separate mechanism for manually adjusting the pitch of the propeller directly while the governor adjusts the engine throttle to effect constant rotational speed; and a mechanism for manually switching from one system to the other while in flight in order to obtain the greatest utility of the power package.

An important object is to provide a reversible propeller control system which is inherently safe because the propeller cannot be overspeeded inadvertently.

Other objects and advantages of the present invention will become more apparent upon reference to the following detailed specification taken in connection with the accompanying drawings, in which:

FIG. 1 is a schematic view showing a simplified diagram of the power management system;

FIG. 2 shows an alternate position of one of the valves of FIG. 1;

FIGS. 3 through 6 are views looking in at the end of a propeller blade and showing various pitch positions of the propeller;

FIG. 7 is a section indicated by line VII–VII on FIG. 9 and showing the manual control mechanism which is linked to the various control devices of FIG. 1;

FIG. 8 is a view looking in at the right side of FIG. 7;

FIG. 9 is a section indicated by line IX–IX on FIG. 7; and

FIG. 10 is a plan view looking down on top of FIG. 7.

Referring to the drawings more in detail, in FIG. 1, 10 represents a somewhat schematic view of an assembly of a variable pitch propeller. A hydraulic governor 12 is attached to the propeller drive engine and incorporates a boost pump 13. A "Beta" valve 14 acts as a hydraulic low pitch stop for propeller 10. The engine carburetor throttle is indicated at 16 and a hydraulic motor 18 is mechanically linked to carburetor throttle 16. A hydraulic valve 20 connects the output side of governor 12 with Beta valve 14 when valve 20 is in position A. When valve 20 is in position B, the output side of governor 12 is connected with one side of hydraulic motor 18. Valve 20, when in position B, also connects the output side of boost pump 13 with Beta valve 14 for actuation of propeller 10.

Referring to propeller 10, 24 is the propeller hub spider which is fixed to the end of engine shaft 26 for rotation thereby. Blades 28, only one being shown in FIG. 1, are attached to hub spider 24 by means of clamps 30 so as to be rotatable on their respective axes.

Mounted on clamps 30 are counterweights 32 which are acted upon by centrifugal force when the propeller rotates tending to move the blades into high pitch position and feathered position, from low pitch position. Also mounted on hub spider 24 is piston 34 which can slide in the fore and aft direction on the hub spider, imparting rotational motion to blade clamps 30 by means of connecting links 36 to thereby adjust the propeller pitch.

Also attached to the inside of the head of piston 34 is central, axially extending, hollow piston guide rod 38, which has a flange 40 at its free end supporting one end of spring means 44, usually two concentric spiral compression springs. The other end of spring means 44 is supported by shoulder 42, which is attached to hub spider 24 at its front end.

Oil from conduit 68 enters annular rotary seal 69 and then enters shaft 26 through radial ports 46 in the shaft. The oil can also enter the central part of hub spider 24 and flow into the central portion of piston 34 through piston guide rod 38 and ports 48 therein. This oil, under pressure, tends to move the piston to the left, as viewed in FIG. 1, which direction of movement of the piston acts to decrease the pitch of the propeller and move the blades on into reverse. The reverse pitch position of the propeller blades is shown in FIG. 3.

Spring means 44 acts in unison with counterweights 32 tending to oppose the oil pressure acting on the piston, or, in effect, to move the pitch away from the reverse pitch position of FIG. 3 toward high and feathered positions. Low positive pitch position of the propeller is shown in FIG. 4; high pitch positive position is shown in FIG. 5; while feathered position is shown in FIG. 6.

Governor 12 (FIG. 1) is a conventional flyball type governor which controls the rate of oil supply by boost pump 13 to piston 34 of propeller 10 for forward thrust flight conditions as illustrated in FIGS. 1, 4, and 5 when valve 20 is in position A. Governor 12 consists essentially of stationary housing 49, rotatable sleeve 50, which is drivingly connected to the engine for rotation thereby, and flyballs 52 mounted on sleeve 50 for rotation therewith and acting on valve member 56.

Flyballs 52 are acted upon by centrifugal force, in opposition to spring 54, and tend to raise valve member or spool 56 during an overspeed condition, or to lower spool 56 during an underspeed condition. When an underspeed condition exists, spool 56 opens port 58, allowing oil from boost pump 13 to flow through conduit 60 to valve 20, and through valve 20 to conduit 62 and then into chamber 64 of Beta valve 14.

Since Beta valve 14 acts as the hydraulic low pitch stop, it is in the closed or null position, as shown in FIG. 1, only when the pitch is at the low position of FIG. 4, or when acting as a hydraulic stop in the reverse range of pitch. For the forward thrust pitch range, valve 14 is open, so that chamber 64 is open to chamber 66, whereby the governor oil referred to can flow through conduit 68 and ports 46 into the hollow hub spider and then through guide rod 38 and its ports 48 to piston 34. This oil supply, as mentioned, reduces the propeller pitch and allows the propeller to rotate faster, thus correcting the underspeed condition that initiated the described cycle.

When an overspeed condition exists, and valve 20 is still in its position A, spool 56 is raised by flyballs 52 and oil flows backwardly through the same passages back to port 58. Port 58 is now open to drain passage 70 in sleeve 50, due to the raised position of valve member or spool 56, and the oil will thus drain to exhaust. This drainage of oil from piston 34 allows counterweights 32 and spring means 44 to increase the propeller pitch, which reduces the propeller rotational speed and thereby corrects the overspeed condition that initiated the described cycle.

The action of the hydraulic low pitch stop is described as follows:

When the propeller speed is below the value set for the governor 12, viz. when an underspeed condition exists, the governor 12 calls for oil to be sent to the propeller piston 34, as described above. If the engine power is reduced, the piston 34 moves as far as it can to the left until it reaches the low pitch stop. In the present case, the low pitch stop takes the form of hydraulic valve 14. When valve 14 operates to determine the low pitch of the propeller, it substantially shuts off the oil from the governor 12 to piston 34, and, at the same time, is prepared to open a drain passage leading from the propeller piston 34 back to the engine reservoir.

This closing of Beta valve 14 is accomplished when lug 72, attached to piston 34, engages nut 74 on rod 76, pulling rod 76 to the left, as it is viewed in FIG. 1, against the thrust of spring 78. Spring 78 bears between lug 80 on the hub spider 24, and flange or collar 82 attached to rod 76. Rod 76 is attached to slip ring 84 so the slip ring and rod will move together. Linear motion of piston 34 is transmitted to a linkage system by means of slipper block 86 which is contained between the spaced radial flanges of slip ring 84.

The linkage system comprises a link 88, attached to slipper block 86 at one end, and connected at the other end to one end of lever 90. The other end of lever 90 is pivotally secured to reverse control rod 96, which is adjustable but which remains fixed during normal operation. Lever 90 is pivotally connected at a point between the ends thereof to the end of one arm of a bellcrank lever 92, which, in turn, has the end of the other arm pivotally connected to valve spool 94 of valve 14. Lever 92 is supported at its fulcrum point to lug 98, of housing 100 of valve 14.

When piston 34 moves to low pitch position, the above-named linkage comes into play to lower spool or valve member 94, which substantially seals off chamber 64 from chamber 66, thereby substantially shutting off flow of governor oil. At the same time chamber 102 is about to be opened to chamber 66, which will allow oil to drain from chamber 66 through passage 104. The system assumes a position of equilibrium when oil from the governor leaks past spool 94 as fast as oil in chamber 66 leaks past spool 94 into chamber 102. This establishes the low stop position, when Beta valve 14 is in the null position as shown in FIG. 1.

If the pitch of the propeller is in the reverse pitch range, the piston will be moved to the left, from its FIG. 1 position and the spool 94 will be lowered to shut off governor from the piston and to commence to open the drain, This will allow the spring means 44 and counterweight 32 to move the pitch toward forward pitch position. As soon as movement of piston 34 toward positive pitch position has resulted in raising spool 94 to the point where the chamber 102 is substantially sealed off from chamber 66, and chamber 66 commences to open to chamber 74, further movement of piston 34 ceases; and the system comes to a point of equilibrium at the low pitch stop position.

Reversing the propeller pitch:

This is accomplished by moving reverse control rod 96 to the right, as viewed in FIG. 1. This action is transmitted through lever 90 and bellcrank lever 92 to raise spool 94 allowing governor oil to move into piston 34 as described, thereby moving the propeller into reverse pitch position. As soon as the piston moves beyond the normal low pitch position, however, the piston carries with it nut 84, rod 76, slip ring 84, and slipper block 86, which in turn causes spool 94 to be lowered to the point where the governor oil is effectively sealed off. This establishes the new low pitch, which now becomes the reverse pitch stop. Thus the propeller is reversed by moving the low pitch stop into the reverse pitch range—when the governor is operating in the underspeed condition only.

When the governor is "on" speed, i.e. neither underspeed or overspeed, the low pitch stop is not effective since the pitch is normally above the low pitch position and is controlled only by the governor oil.

Also, if the propeller is in the reverse pitch range, and the r.p.m. is raised to the "on speed" position of the governor, the governor may call for "drain" which would result in the piston moving towards flat or zero pitch position. This would result in overspeed because the engine load reduces but the governor will continue to drain for overspeed. This condition represents an abnormal condition that could result in failing of the propeller if not checked. This hazard, however, is overcome by taking the governor out of the propeller pitch system during reverse pitch operation, as will be described later.

*Reverse pitch operation with governor controlling the throttle:*

Since, during reverse pitch operation, the governor cannot control the pitch of the propeller, and consequently cannot control the engine speed, it becomes necessary to use the governor to control engine speed by utilizing the governor for adjusting the engine throttle. The boost pump 13 is required, however, to maintain a supply of oil under pressure for moving piston 34. In order to transfer the function of the governor and boost pump, valve 20 has been introduced into the system.

While valve 20 is in position A as shown in FIG. 1, spool or valve member 106 thereof is in the full-right position, allowing oil from governor 12 to flow to Beta valve 14 as described above for forward thrust operation.

For reverse thrust (or reverse pitch) operation, the spool or valve member 106 of valve 20 is moved to the left. The left-hand position of the knob on stem 156 of valve 20 is shown in dotted outline at position B in FIG. 1. The spool 106, in its left-hand position is shown in FIG. 2. When valve 20 is shifted to its left-hand position, FIG. 2 position, namely to position B, oil from governor 12 is shunted to motor 18 via conduit 110, while oil from boost pump 13 is routed through conduit 108 to valve 20 and thence through conduit 62 to Beta valve 14. The propeller has a constant source of oil pressure for control of piston 34 during reverse pitch operation. The propeller pitch, during reverse pitch operation, is regulated by adjusting control rod 96 to the desired reverse pitch position which will adjust spool 94 of valve 14 to cause oil flow to propeller piston 34. As soon as piston 34 reaches the position corresponding setting of rod 96, the feedback linkage consisting of lug 72, rod 76, slip ring 84, block 86, link 88, lever 90, and lever 92, will shift valve member 94 of Beta valve 14 to the null position and the system will again be in equilibrium.

The governor oil, in the meantime, flows through valve 20, which is in position B, through conduit 110 into the right end of motor 18, during the underspeed condition of governor 12. Oil pressure so supplied to motor 18 acts on piston 112 to move it toward the left, as shown in FIG. 1. Piston 112 is connected by piston rod 114 to one end of a lever 116. The other end of lever 116 is connected to link 120 leading to manual throttle lever 124. An intermediate point of lever 116 is connected to one end of link 118 which has its other end connected to lever 120 of butterfly valve 122. Leftward movement of piston 112 will act through the described linkage to open valve 122, thereby increasing the engine power and raising the rotational speed.

Governor oil pressure supplied to motor 18 is opposed by engine oil pressure, which is at a lower pressure level. Engine oil enters motor 18 through conduit 125 and urges piston 112 of motor 18 toward the right, and, in the absence of governor oil pressure, will move piston 112 toward the right. Thus, the carburetor throttle valve 122 is opened to increase r.p.m., or closed to reduce r.p.m., and is modulated by the governor to maintain substantially constant r.p.m. during reverse pitch operation of the propeller.

It will be noted that the supply to pump 13 is from conduit 125 so that pump 13 is, in effect, connected across motor 18 when valve 20 is in its B position. While it is of advantage to employ engine oil to bias piston 112 toward the right, this could also be done by spring means, similar to spring means 44 for the pitch-changing fluid motor.

The engine throttle control lever 124, which, as mentioned, is linked to lever 116 by means of link 126, is left in the closed position (shown in dotted outline in FIG. 1 during reverse pitch operation. It is, in fact, locked in this position, as will be described later.

During forward pitch operation when valve 20 is in position A, the right side of piston 112 is connected to drain line 128, and engine oil moves piston 112 to the extreme right against a suitable stop device.

With the governor controlling the throttle and the pilot controlling the propeller pitch directly, during reverse pitch operation of the propeller, it becomes possible to obtain the greatest benefit from the reversible propeller without the possiblity of overspeeding the engine and propeller.

In order to provide for maximum thrust obtainable, almost instantly, it is necessary for the engine to be turning at maximum speed continuously. Adjustment of the propeller pitch into reverse pitch by the pilot can be accomplished within 1 or 2 seconds, depending upon the flow rate of oil from the boost pump 13. As the propeller goes through flat pitch, the power required to drive the propeller is reduced, and the engine will speed up, whereupon the governor reduces the throttle valve opening. As the propeller moves into reverse pitch position, the power required to drive the propeller increases and the governor opens the throttle valve just enough to maintain constant r.p.m. When the propeller reaches full reverse pitch position, the governor automatically opens the throttle to full open position.

The reverse order of events takes place when coming out of reverse pitch.

The power management system, described above, can be manipulated by means of individual hand controls as illustrated in FIG. 1; but if the pilot should fail to manipulate these controls in proper sequence and at the proper times, disastrous results could occur. In order to safeguard against improper manipulation of the controls, it is advisable to provide a power control quadrant which combines the throttle, the reverse control, and the control of valve 20 in a single coordinated or integrated control system. Such a quadrant is shown in FIGS. 7 to 10.

*Power control quadrant:*

In FIGS. 7 to 10, the quadrant housing, indicated at 130, consists of a generally rectangular box, open at the bottom, and also open over about half of the rear. The top wall of the box is formed on a radius. Axle or shaft 132 is supported in the fore and aft direction by the front and rear walls of housing 130. Nuts 134 on axle 132 prevent the axle from sliding in the fore and aft direction in housing 132 but permit the axle to rotate on its axis.

Pinned to the central part of axle 132 is lever support 136, which is slotted to receive master lever 138. Master lever 138 is also pivotally mounted on bolt 140 which passes through lever support 136 at right angles to axle 132. Master lever 138 and support 136 can rock as a unit about the axis of axle 132. Master lever 138, as one of its functions, actuates link 126 in the same way as lever 124, above referred to.

Also attached to one arm of lever support 136 is ball 142. Pin 144 is employed to secure ball 142 in place on support 136. A pair of brackets 148 are secured to the inside of quadrant housing 130 by weldments or other suitable means. A two-armed lever, or bellcrank, 146 is pivotally mounted between brackets 148 by means of a pivot bolt 150. Bellcrank 146 is pivotal in a horizontal plane about the axis of bolt 150 and has slot 152 extending in the fore and aft direction of the housing 130 to receive ball 142. Sideways movement of ball 142 as brought about by sidewise movement of lever 138 results in rotating bellcrank 146 about the axis of bolt 150.

Also formed in bellcrank 146 is link hole 154. This link hole 154 is linked to spool or valve member 106 of valve 20 of FIG. 1, by link rod 156, clevis 158, and pin 160. Thus, when master lever 138 is moved from one side of the quadrant housing 130 to the other side, link rod 156 moves linearly in the fore and aft direction of the housing, which results in the moving of valve spool 106 of valve 20 between its A and B positions. Specifically, when lever 138 is moved downwardly in FIG. 10, spool 106 is in its position B whereas movement of lever 138 upwardly in FIG. 10 will move spool 106 to its position A. The quadrant housing is so arranged that movement of lever 138 upwardly in FIG. 10 would be to the left as viewed by the pilot (see FIG. 7) while movement of lever 138 downwardly in FIG. 10 would be to the right as viewed by the pilot (FIG. 7).

Also mounted within quadrant housing 130 are levers 162 and 164 which are pivotally mounted on respectively opposite sidewalls of quadrant housing 130, coaxially with bolt 140, by means of bolts 166 and 168. Knurled hand nuts 170 and 172 threaded on bolts 166 and 168 are used to provide friction between levers 162, 164 and housing 130. To this end, spring washers 174 and 176 are mounted between the heads of bolts 166, 168 and the respective levers and press against the sides of the levers and provide uniform friction for all movements of levers 162 and 164. Friction washers may be placed between the levers and the housing walls if desired.

When master lever 138 is in its neutral position, as shown in FIG. 9, levers 162 and 164 are locked against movement in the fore and aft direction by means of respective spring loaded pins 178 and 180 which pass through holes in the sidewalls of housing 130 and through corresponding holes 182 and 184 in levers 162 and 164. Pins 178 and 180 are riveted on the ends of leaf springs 186 and 188 which are, in turn, secured to the sidewalls of housing 130 by means of rivets 190 and 192. These springs force the pins 178 and 180 through the holes 182 and 184 of levers 162 and 164 when the levers are in their FIG. 7 position, preventing either lever from moving in either direction until the lock pin is displaced from the locking hole in the lever.

Levers 162 and 164 comprise extensions 191 and 193 to which are pivoted, by means of pins 198 and 200, clevises 194 and 196. Clevis 194 is secured to control rod 96 of FIG. 1; while clevis 196 is secured to link 126 of FIG. 1.

Master lever 138 is fitted with laterally projecting pin elements 202 and 204 which push lock pins 178 or 180 out of holes 182 or 184 when said lever is moved to the right side or the left side of housing 130. The respective pin element 202 or 204 enters the hole 182 or 184, from which the respective lock pin is displaced thereby and mates master lever 124 to the respective lever 162 or 164 for fore and aft movement thereof together with lever 124.

Master lever 138 is guided in its fore and aft movements by the laterally spaced parallel slots 208 and 210 formed in the top wall of quadrant housing 130. When the master lever is mated up with lever 162, it slides in slot 208. Slot 106, 208 prevents pin element 202 from backing out of hole 182 of lever 162 when the lever is sliding in the fore and aft direction. An extension of slot 208, at 206, permits rearward movement of lever 138 when it is mated to lever 162.

Likewise, master lever 138 is guided by slot 210 when pin element 204 is mated with hole 184 formed in lever 164, thereby preventing the two levers from separating when they are moved in the fore and aft direction.

Cross slot 212 joins slot 208 at the neutral position of the master lever, and its extension 206, with slot 210, and provides for alignment of pin elements 202 and 204 with their corresponding holes 182 and 184 in levers 162 and 164.

Operation of the master control lever 138 along slot 210 when the master lever is locked to lever 164, causes the throttle valve 122 to open or close, while at the same time valve 20 is in position A, and Beta valve 14 is adjusted to provide for flow of governor oil to the propeller.

Moving master control lever 138 laterally in the cross slot 212, from the left side of housing 130 to the right side thereof, causes lever 164 to be locked in the throttle closed position, by virtue of the fact that the spring loaded lock pin 180 will engage hole 184 in lever 164. Furthermore, movement of master lever 138 to the right in cross slot 212 causes bellcrank 146 to rotate in a direction to move push rod 156 in the forward direction, toward the right, as viewed in FIG. 10, which moves spool 106 of valve 20 to position B. This movement of spool 106 transfers the governor control from the propeller to the throttle and also connects the output side of boost pump 13 with the inlet port of Beta valve 14.

Also, pin element 202 engages the end of pin 178 and forces the latter out of hole 182, pin 202 taking the place of pin 178. This mates master lever 138 to lever 162. Movement of lever 138 towards the rear along slot extension 206, to the left, as viewed in FIG. 10, causes push rod 96 to move to reverse pitch position as shown in FIG. 1. Moving master lever 138 forward, along slot 208, or to the right in FIG. 10, causes push rod 96 to move to the forward pitch or forward thrust position, as shown in FIG. 1.

Levers 162 and 164 are provided with arcuate rearward extensions 214 and 216, respectively, which serve to hold pins 178 and 180 in their outer positions when said levers are moved forwardly out of their locked position. Lever 162 is also provided with a forward extension 191 which serves the same purpose when this lever is moved rearwardly.

Flight Control:

During takeoff, climb, and cruise, the master control lever 138 is in its left-hand position and is mated with throttle lever 164 and is movable in slot 210. The governor controls the pitch of the propeller to maintain constant r.p.m. The pilot controls the power by manually controlling the throttle by manipulation of master lever 138.

For approach to the landing field, the pilot closes the throttle and shifts master lever 138 rightwardly through cross slot 212 to a position where it will mate with lever 162. Lever 164 at this time is locked in place. This movement of lever 138 transfers the governor control from the propeller to the throttle, as described above, so that the throttle is opened just far enough to bring the engine r.p.m. up to the value set by the governor. It is ordinarily desired that the engine r.p.m. be set for the maximum value for this condition.

The pilot then points the aircraft toward the end of the runway and establishes the airspeed which is proper for this condition, by regulating the thrust or drag of the propeller. When master lever 138, which now registers with slot 208 and extension 206 thereof, is moved forward increasing thrust results, while moving it rearward results in increasing drag, or reverse thrust. If the aircraft is judged to be too high in altitude or going too fast, the pilot moves the lever in a rearward direction which increases negative thrust. If the aircraft is judged to be too low or going too slow, the pilot moves the lever forward, which increases the thrust. The fact that the r.p.m. is maintained at a maximum value results in instantaneous response to the changes in the position of lever 138, so that any correction of the speed and flight path is very effective. This control over propeller negative thrust, as well as positive thrust, makes it possible for the pilot to approach the landing field over a much wider range of airspeeds and altitudes than possible with the conventional system where reverse thrust is not available.

When the aircraft approaches the end of the runway and is still, say, some 25 feet above the surface, the airspeed is gradually reduced by reducing thrust, until the aircraft has settled on the runway. At that instant, the master lever 138 is moved to the rear, so that reverse thrust is increased rapidly to the desired value. The governor automatically opens up the engine throttle to provide the power necessary to maintain constant engine r.p.m. This can result in the shortest landing run possible, because of the short time required to achieve the full reverse thrust condition. Furthermore, it is the safest method for reversing the pitch of the propeller because the governor prevents the engine from overspeeding during the period when the propeller is near or is in flat pitch.

Taxiing the aircraft may also be done with the lever 138 in its right-hand position wherein it is mated with lever 162, since the pilot has precise control of the thrust and drag of the propeller which usually eliminates the necessity of applying brakes. He can also back up the aircraft if desired.

This system is particularly valuable for maneuvering float planes while on the water.

From the foregoing it will be perceived that the present invention provides the combination of a variable pitch propeller driven by an engine having a throttle to vary the fuel supply to the engine. The propeller has a pitch-changing mechanism that is continuously biased toward maximum positive pitch position and which includes a fluid motor responsive to fluid pressure for urging the pitch-changing mechanism toward negative pitch position.

A pitch stop device is included in the propeller structure, which is manually adjustable to provide a stop to stop the propeller in a predetermined pitch position when moving toward negative pitch.

The engine throttle has a manual control device connected thereto and also has a fluid motor connected thereto which is biased in a direction to close the throttle and is operable by fluid pressure to move the throttle in opening direction.

A first source of pressure fluid is provided in the form of an engine-driven boost pump 13 which supplies fluid at a substantially constant pressure and which pressure is high enough to overcome the biasing means of either the pitch-changing mechanism or of the fluid motor connected to the throttle.

A second source of fluid is provided by a governor with the fluid supplied by the governor being at a pressure which varies in conformity with the engine speed; rising as the engine speed drops below a predetermined amount and falling when the engine speed rises above the predetermined amount.

The biasing means for the pitch-changing mechanism is preferably in the form of a spring, while the biasing means for the fluid motor connected to the throttle may be the engine oil, which is also at a substantially constant pressure less than that of the boost pump.

In operating the airplane, during takeoff and cruising, the governor controlled source of pressure is connected to the pitch-changing mechanism, while the fluid motor for the throttle is connected to drain, and the throttle is adjusted manually. The pitch-changing mechanism operates automatically to regulate the propeller pitch so as to maintain the engine speed substantially constant.

During landing and in taxiing the plane, on the other hand, the governor-controlled source of fluid is connected to the fluid motor for the throttle, while the boost pump is connected to the pitch-changing mechanism, and the manually adjustable stop for the pitch-changing mechanism is adjusted to provide for positive or negative pitch, as may be required.

During landing and taxiing, the propeller pitch is adjusted manually and the adjustment of the throttle by the source of fluid from the governor tends to maintain the engine speed substantially constant.

The controls by means of which the foregoing is accomplished, except for the manual adjustment of the pitch stop, are interlocked by the device of FIGS. 7 to 10 so that improper manipulation of the controls is not possible.

I claim:

1. A power management system for a variable pitch propeller-engine combination, comprising: an engine throttle for controlling the power output of said engine; a propeller connected to said engine for rotation therewith; hydraulic pitch control mechanism for adjusting the pitch of said propeller from neutral pitch in both forward and negative directions; a fluid pump actuated by said engine, a reservoir connected to the suction side of said pump; a fluid governor driven by said engine for sensing the rotational speed thereof and having its inlet connected to the discharge side of said pump, said governor having an outlet port adapted to discharge to said propeller pitch control mechanism to reduce the pitch of the propeller when the engine rotational speed is below a prescribed value, said governor draining fluid from said propeller pitch control mechanism to increase the pitch of the propeller when the engine rotational speed is above a prescribed value; a hydraulic low or reverse pitch stop valve located between said governor outlet and said propeller pitch control mechanism and actuated by said propeller to shut off the supply of fluid from said governor to said pitch control mechanism when the pitch of the propeller is reduced to a prescribed value; a hydraulic motor and a manual control connected to said engine throttle for actuating said engine throttle; a manually operated two-position valve connecting said governor outlet with said propeller pitch mechanism when in one position and connecting said governor outlet with said hydraulic motor and also connecting said pump outlet with said low or reverse pitch stop valve when in the other position; and a manual control for adjusting the low or reverse pitch position of the propeller at which said low or reverse pitch valve is actuated to shut off the fluid to said propeller pitch control mechanism.

2. A power management system as described in claim 1, in which said low or reverse pitch stop valve comprises a piston which is moved by said propeller pitch control mechanism and which restricts the flow from the pump while at the same time commences to open a passage to the pitch control mechanism which drains fluid from said propeller pitch mechanism to balance the fluid flow from the pump and said draining fluid to result in zero flow to said propeller pitch control mechanism when said propeller pitch is reduced to said prescribed value.

3. In combination, a variable pitch propeller having a pitch-changing mechanism and an engine driving said propeller and having a throttle, an engine-driven fluid governor having an outlet port which provides oil at a pressure which varies when the engine speed deviates from a prescribed value, a first fluid motor connected to said pitch-changing mechanisms, a second fluid motor connected to said throttle, a selector valve adjustable for connecting the outlet port of said fluid governor with either one of said fluid motors, first manual means for adjusting said throttle when the respective fluid motor pertaining thereto is disconnected from the outlet port of said fluid governor, a further valve in the form of a low pitch stop valve interposed between said selector valve and said first fluid motor and actuated by said propeller as the propeller pitch is reduced to cut off the supply of fluid to said first fluid motor, an element connected to said propeller pitch-changing mechanism to be moved thereby and also connected to said low pitch stop valve to move the low pitch stop valve, and second manual means connected to said element for moving the element to adjust the pitch position of the propeller at which said low pitch stop valve is actuated by said propeller.

4. A variable pitch propeller according to claim 3, in which said first manual means includes a first link connected to said throttle to adjust said throttle independently of said second fluid motor, said second manual means including a second link connected to said element, and said selector means including a master control lever having a first position wherein it is connected to said first link and a second position wherein it is connected to said second link, said master control lever being movable when in said first and second positions to adjust said throttle and said element respectively, said master control lever also being linked to said selector valve so that movement of said master control lever from said second position to said first position will move said selector valve into position to connect said governor outlet port to said first fluid motor of said pitch control mechanism while movement of said master control lever from said first position to said second position will move said selector valve into position to connect said governor outlet port to said second fluid motor connected to said throttle.

5. A variable pitch propeller according to claim 4 in which said master control lever is movable between said first and second positions in only one adjusted position thereof, lock means normally locking said first and second links against movement, and means operable upon moving said master control lever into its said first or second position for unlocking the lock means of the respective said first or second link.

6. A variable pitch propeller according to claim 5 in which said one adjusted position of said master control lever is that position wherein said throttle is closed and said further low pitch stop valve is in its normal low positive pitch stop position.

7. In combination; a variable pitch propeller and a drive engine connected thereto, spring means urging said propeller toward maximum positive pitch position and a first fluid motor responsive to fluid pressure to move said propeller toward maximum negative pitch position, a throttle for said engine, a second fluid motor and a first link both connected to said throttle for adjustment thereof independently of each other, a first source of fluid at substantially constant pressure, a second source of fluid at a pressure which is high below a predetermined engine speed and low above a said predetermined engine speed, a selector valve having a first position wherein said second fluid motor is connected to said first fluid motor and said second fluid motor is connected to drain and a second position wherein said first source is connected to said first fluid motor and said second source is connected to said second fluid motor, stop means for stopping said propeller pitch in a predetermined position when moving under the influence of said first motor in a direction away from maximum pitch position, a second link connected to said stop means for adjustment thereof from a normal position wherein the propeller pitch is stopped in a predetermined low positive position toward a position wherein the propeller pitch is stopped in negative position, a master control center including a movable control lever, said control center having a first adjusted position wherein said first link is connected to said control lever while said second link is locked and said selector valve is in its said first position and a second adjusted position wherein said second link is connected to said control lever while said first link is locked and said selector valve is in its said second position.

8. A combination according to claim 7 in which the locked position of said first link is the throttle-closed position thereof and the locked position of said second link is the said normal position thereof.

9. In combination; a variable pitch propeller having a pitch-changing mechanism operable to adjust the propeller pitch from maximum positive pitch through zero pitch to maximum negative pitch position, first biasing means biasing said pitch-changing mechanism in a first direction toward maximum pitch position; a first fluid motor connected in opposition to said first biasing means to move said pitch-changing mechanism in a second and opposite direction toward maximum negative pitch position, a drive engine connected to said propeller and having a throttle, second biasing means biasing said throttle toward closed position, a second fluid motor connected in opposition to said second biasing means, a first and substantially constant pressure source of fluid, a governor sensitive to engine speed and having a fluid outlet port forming a second source of fluid having a pressure which deviates from a prescribed value when the speed of the engine varies, a selector valve hydraulically interposed between said first and second fluid motors on the one hand and said first and second sources on the other hand and having a drain connection, a valve member in said selector valve having a first position wherein said second source is connected to said first fluid motor while said second fluid motor is connected to drain and a second position wherein said first source is connected to said first fluid motor while said second source is connected to said second fluid motor, first manual means connected to said throttle for effecting manual adjustment thereof when said selector valve member is in its said first position, stop means operated by said propeller-pitch-adjusting mechanism during movement thereof in said second direction for interrupting the supply of fluid to said first fluid motor thereby stopping said pitch-adjusting mechanism in a predetermined position during movement thereof in said second direction, and second manual means connected to said stop means for adjusting said stop means to adjust said predetermined position.

10. The combination according to claim 9 in which said stop means includes a control valve through which the fluid supplied to said first motor passes and having an inlet port receiving said fluid and having another port connected to said first fluid motor and also having a drain port, a shiftable control valve member operable for controlling the ports of said control valve and to which valve member said second manual means is connected, means biasing said control valve member toward a first position wherein said outlet port is connected to said inlet port, and means operated by said propeller at a predetermined pitch position thereof during adjustment of the pitch of the propeller in said second direction for moving said control valve member toward a second position wherein said outlet port is disconnected from said inlet port and is instead connected to said drain port.

11. The combination according to claim 9 which includes a master control lever, a casing in which said master control lever is mounted, a lateral slot in the casing permitting lateral movement of said master control lever therein, a longitudinal slot extending from each end of said lateral slot for longitudinal movement of the master control lever in each of its lateral positions, means to connect said master control lever to said first manual means in response to movement of said master control lever laterally in said lateral slot into alignment with one of said longitudinal slots and to said second manual means in response to movement of said master control lever laterally in said lateral slot into alignment with the other of said longitudinal slots, and means connecting said master control lever to the valve member of said selector valve for moving said valve member into its said first position when said master control lever is connected to said first manual means and into its said second position when said master control lever is connected to said second manual means.

12. In combination, a variable pitch propeller having a pitch-changing mechanism and an engine driving said propeller and having a throttle, a governor driven by said engine, first adjustable means connected to said pitch-changing mechanism and first governor-operated means connected to said pitch-changing mechanism, second adjustable means connected to said throttle and second governor-controlled means connected to said throttle and selector means movable into a first position for operatively connecting said governor to said first governor-controlled means while making said second governor-controlled means ineffective thereby to obtain automatic control of propeller pitch in conformity with engine speed while adjusting the power developed by the engine by manual actuation of said second adjustable means, said selector means being movable into a second position for operatively connecting said governor to said second governor-controlled means while making said first governor-controlled means ineffective thereby to obtain automatic control of the power developed by the engine in conformity with engine speed while adjusting the pitch of said propeller by adjustment of said first adjustable means, said selector means including a single lever which is coupled to said second adjustable means in the said first portion of said selector means and to said first adjustable means in the said second portion of said selector means.

13. A variable pitch propeller according to claim 12 in which said governor is a fluid governor having an outlet port which provides oil at a pressure which varies when the engine speed deviates from a prescribed value, said first governor-controlled means comprising a first fluid motor connected to said pitch-changing mechanism, said second governor-controlled means comprising a second fluid motor connected to said throttle, and said selector means comprising a selector valve interposed between said governor outlet port and said first and second fluid motors.

14. In combination: a variable pitch propeller and a variable power drive engine connected thereto and having an adjustable throttle, first automatic means for adjusting the pitch of the propeller in response to changes in engine speed to maintain the speed of the engine substantially constant, first manual means for adjusting the pitch of the propeller, second automatic means for adjusting the throttle of the engine in response to changes in engine speed to maintain the speed of the engine substantially constant, second manual means for adjusting said throttle; a main control lever, means for connecting said lever selectively with said first and second manual means while simultaneously locking the other thereof and while also simultaneously making the said automatic means pertaining to the locked manual means effective and the automatic means pertaining to the manual means which is connected to said control lever ineffective, said first and second automatic means comprising a single engine-driven governor common to both thereof.